Patented June 19, 1934

1,963,943

UNITED STATES PATENT OFFICE 1,963,943

PROCESS FOR DISINTEGRATING AND DEVULCANIZING RUBBER SCRAP

Russell R. Gross, Akron, Ohio, assignor to The Xylos Rubber Company, Akron, Ohio, a corporation of Ohio No Drawing. Application May 31, 1930, Serial No. 458,922

8 Claims. (Cl. 18—52)

This invention relates to a process for reclaiming rubber scrap by disintegration and devulcanization.

The commercial method of reclaiming rubber from scrap as almost universally practiced, comprises digesting the scrap, to which a small amount of oil or tar is added, with a caustic soda solution at a temperature of approximately 365° Fahrenheit and a pressure of 175 pounds per square inch for a period of from five to thirty hours, then washing, (sometimes treating with acid and washing again) drying, straining, milling and refining. This process results in a loss of all of the textile fiber and a portion of the rubber, in addition to the other disadvantages of long duration of treatment, cost of power, water and chemicals and the problem of disposal of the waste liquors.

Again, it has been suggested that the rubber to be reclaimed be subjected to the action of a swelling agent having a low boiling point such as carbon-bisulphide, acetone, benzene or the like. The swelling agent and the rubber are brought together under heat and pressure in closed container in which the pressure is suddenly released to further sponge and explode the rubber after which any fiber is removed by straining, floating or other processes. This method requires the use of expensive swelling agents which must be recovered to make the process practical. It is comparatively slow and necessitates expensive equipment.

The general purpose of the invention is to overcome the difficulties and disadvantages of the prior art by the provision of a rapid, inexpensive, and efficient method for reclaiming rubber.

It is also an object of the invention to devise a method which is adapted to reclaim or devulcanize rubber scrap of all types including that with textile fibers therein, such as tire carcasses and that without fibers therein, such as solid tires, air bags, tubes and the like.

Another object resides in providing a method which eliminates the use of expensive chemical agents.

A further object of the invention is the provision of a process for reclaiming rubber with textile fibers therein by which method the reclaimed rubber retains substantially all the textile fibers therein but in such a comminuted, distributed condition that the reclaimed rubber can be milled, compounded and handled in a manner similar to the stock containing no textile fibers.

The above and other objects of the invention are achieved by the method herein described, it being understood that the invention is not limited to the exact procedure described. This application is a continuation in part of my co-pending application Serial No. 222,951 filed September 29, 1927.

According to the present invention the rubber scrap is first broken up by a hogger or other means, preferably to such a size that the pieces will pass through approximately a one-half inch screen. It will be understood that scrap of all types or from all sources is not as a rule mixed together but that all solid tire scrap is kept and handled together, all pneumatic tire scrap handled together, etc. In other words scrap from the various sources demands somewhat varied treatment particularly as to length of treating time as hereafter more fully explained.

After the rubber scrap has been broken up into small particles, a suitable batch thereof is subjected to steam at a substantial temperature and pressure for a predetermined time. The size of the batch is determined by the handling apparatus which is in the form of a closed chamber.

After the determined treating time has elapsed the pressure is suddenly released from the batch in any known manner. The pressure release is ordinarily accomplished by removing a cap or plug from an orifice in the closure mentioned above so that the pressure release will blow the material out through the orifice and into any suitable device for separating the steam from the product, such as a cyclone separator.

Subjecting the rubber batch to steam in this manner will cause the steam to penetrate into the rubber particles so that when the pressure is suddenly released the particles are exploded or disintegrated by the steam pressure within the particles. The resulting rubber batch is a gummy, soft mass of minute disintegrated particles which after milling and refining can be readily compounded. In using the process with scrap containing textile fibers, it has been found that while certain of the fibers are somewhat charred, that the fibers have as a whole been substantially hydrolyzed and disintegrated so that after milling and refining the devulcanized batch, the fibers have worked into the rubber as a filler and have substantially disappeared.

In practicing the invention, pressures ranging from 300 to 1000 pounds per square inch and temperatures of 400° to 600° Fahrenheit have been successfully used. The time the scrap is subjected to the steam under pressure varies from 1 to 30 minutes or more and is dependent upon the fineness of the scrap and more particularly on the quality or type thereof. This time is also dependent upon the pressure and temperature of the steam that is a low pressure and temperature require a longer treating time than a higher temperature and pressure.

The following are specific examples of the application of the process which have been found to give good results in actual practice:

Inner tube scrap 2½ minutes at 400#/sq. in. at 448° F.

Pneumatic tire scrap 5 minutes at 500#/sq. in. at 470° F.

Solid tire scrap 15 minutes at 600#/sq. in. at 489° F.

While the preferred procedure contemplates the coaction only of the live steam and rubber scrap, it is to be understood that additional reagents including softening, swelling and devulcanizing agents may obviously be employed therewith.

The invention also contemplates preheating the batch when it is initially placed in the container. This will cover a short period of from 1 to 10 minutes using low pressure steam in the neighborhood of 150 to 300 pounds per square inch.

Various modifications of the invention can be resorted to without departing from the spirit of the invention or the scope of the appended claims.

What is claimed is:

1. The process of distintegrating and devulcanizing rubber scrap which comprises the steps of breaking the scrap into relatively small pieces, charging the scrap into a closed container, introducing and maintaining live steam at a relatively low temperature and pressure in the container in direct contact with the scrap to preheat the scrap, introducing and maintaining live steam at a relatively high temperature and pressure in the container for a determinate time and suddenly releasing the pressure in the container whereby the rubber scrap is disintegrated and devulcanized.

2. The process of disintegrating and devulcanizing rubber scrap which comprises the steps of breaking the scrap into relatively small pieces, charging the scrap into a closed container, introducing and maintaining live steam at a relatively high temperature and pressure in the container for a period less than eight hours, and suddenly discharging the contents of the container whereby the action of the steam and the sudden discharge disintegrate and devulcanize the rubber.

3. The process of reclaiming rubber scrap which consists in subjecting the scrap to the action of live steam at a temperature in excess of 266° Fahrenheit and at pressures between 300 and 1000 pounds per square inch, and suddenly releasing the pressure.

4. The process of reclaiming rubber scrap which consists in subjecting the scrap to the action of live steam at a temperature in excess of 266° Fahrenheit and at a pressure of approximately 600 pounds per square inch, and suddenly releasing the pressure.

5. The process of reclaiming rubber scrap which consists in subjecting the scrap to the action of live high pressure steam at temperatures between 400 and 600 degrees Fahrenheit, and suddenly releasing the pressure.

6. The process of reclaiming rubber scrap which consists in subjecting the scrap to the action of live high pressure steam at a temperature of approximately 490 degrees Fahrenheit and suddenly releasing the pressure.

7. The process of disintegrating and devulcanizing rubber scrap containing cotton cords or fabric, which comprises the steps of charging the scrap into a closed container, introducing live steam at a temperature in excess of 266° Fahrenheit and at pressures in excess of 300 pounds per square inch into the chamber in direct contact with the scrap, and suddenly discharging the contents of the container whereby the action of the high pressure, live steam and the sudden discharge chemically change and disintegrate the cotton and rubber.

8. The process of reclaiming rubber scrap, which comprises subjecting the scrap to the action of live steam at a relatively high pressure compared to pressures used in the devulcanization of rubber by the digesting process, and suddenly releasing the pressure whereby the steam absorbed into the material is suddenly expanded, disruptively disintegrating the scrap material.

RUSSELL R. GROSS.